United States Patent [19]

Spruijt

[11] Patent Number: 5,257,170
[45] Date of Patent: Oct. 26, 1993

[54] ELECTRIC CONVERTER WITH SEVERAL INDUCTION COILS

[75] Inventor: Herman J. Spruijt, Wassenaar, Netherlands

[73] Assignee: Agence Spatiale Europeenne, Paris, France

[21] Appl. No.: 640,375
[22] PCT Filed: May 28, 1990
[86] PCT No.: PCT/EP90/00904
   § 371 Date: Mar. 25, 1991
   § 102(e) Date: Mar. 25, 1991
[87] PCT Pub. No.: WO90/15469
   PCT Pub. Date: Dec. 13, 1990

[30] Foreign Application Priority Data

Jun. 2, 1989 [FR] France ............................... 89 07562

[51] Int. Cl.$^5$ ............................................ H02M 3/155
[52] U.S. Cl. ............................... 363/16; 323/222; 323/282; 323/351
[58] Field of Search ................. 323/222, 282, 351; 363/16, 20

[56] References Cited

U.S. PATENT DOCUMENTS

| | | | |
|---|---|---|---|
| 4,184,197 | 1/1980 | Cuk et al. | 363/16 |
| 4,262,328 | 4/1981 | Bloom et al. | 363/16 |
| 4,274,133 | 6/1981 | Cuk et al. | 363/20 |
| 4,720,668 | 1/1988 | Lee et al. | 323/271 |
| 4,961,128 | 10/1990 | Bloom | 363/16 |

FOREIGN PATENT DOCUMENTS

| | | |
|---|---|---|
| 0044663 | 1/1982 | European Pat. Off. |
| 0090782 | 10/1983 | European Pat. Off. |
| 0266743 | 5/1988 | European Pat. Off. |
| 3709989 | 10/1988 | Fed. Rep. of Germany |

OTHER PUBLICATIONS

*Patent Abstracts of Japan*, vol. 6, No. 67 (E-104) (945), Apr. 28, 1982.

*Primary Examiner*—William H. Beha, Jr.
*Attorney, Agent, or Firm*—Richards, Medlock & Andrews

[57] ABSTRACT

An electric converter comprising at least three reactive elements (1, 2, 3) connected in series, and a switching device comprising a switching transistor (4) and a diode (5), the switching transistor operating at a high frequency so that it becomes conductive for a fraction of each period of said frequency. The transistor (4) and the diode (5) are connected to the connection points (12, 13) between the reactive elements (1, 2, 3) so that the diode (5) is conductive only when the transistor (4) is non-conductive and so that it is non-conductive each time the transistor (4) becomes conductive. This device is used to control the electric current from a DC power supply to a load.

17 Claims, 3 Drawing Sheets

ELECTRIC CONVERTER WITH SEVERAL INDUCTION COILS

FIELD OF THE INVENTION

The present invention relates to electric current converter topologies comprising several induction coils.

BACKGROUND OF THE INVENTION

An electric current converter is a device which is used to control the electric current flowing between a current source and a load. A conventional electric converter topology basically comprises an electric switching device and a magnetic coupling means. In a known topology the switching device consists for instance of a MOSFET transistor and a diode, and the magnetic coupling means consists of an induction coil which is sometimes associated with an input or output electric filter.

In such a topology the transistor is controlled at a high switching frequency (e.g. 50 kHz) so as to be conducting in saturation for a determined fraction of a time period. The diode is conducting only during the time that the transistor is not conducting. The magnetic coupling means are sized so as to assure limited voltage and current ripple capability.

SUMMARY OF THE INVENTION

The object of the present invention is to provide a family of converter topologies which offers a wide variety of topologies from which to select the optimum topology to suit any particular application.

The electric converters according to the invention comprise at least three reactive elements connected in series, and a switching device comprising a switching transistor operating at a high frequency so that it becomes conducting for a fraction of each period of said frequency. The transistor and the diode are connected to the connection points between the reactive elements so that the diode is conducting only when the transistor is non-conducting and so that it is non-conducting each time the transistor becomes conducting.

Other features of the invention will be apparent from the detailed description hereinafter, in which the invention is disclosed in detail with reference to the appended drawings.

DETAILED DESCRIPTION

Figure 1:
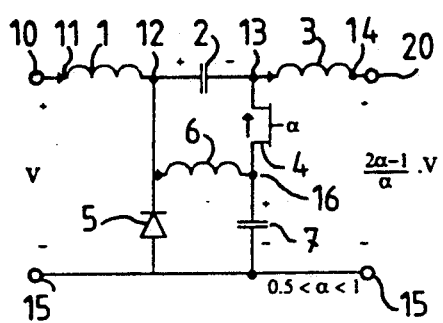
FIG. 1 is a schematic diagram of a buck converter with non-inverted voltage and continuous input and output currents, wherein the three reactive elements are connected in series between an input terminal and an output terminal.

As can be seen from the appended drawings, all the arrangements shown comprise three reactive elements connected in series: a first induction coil 1, a capacitor 2 and a second induction coil 3. A switching power transistor 4 and a diode 5 are connected to the connection points 12 and 13 between the reactive elements 1, 2 and 3 so that the transistor 4 and the diode 5 are never simultaneously conducting, i.e. so that the diode 5 is conducting when the transistor 4 is non-conducting and that the diode 5 is non-conducting each time the transistor 4 becomes conducting.

The arrangement of FIG. 1 represents a buck converter with non-inverted voltage and continuous input and output currents. In this arrangement, the reactive elements 1, 2 and 3 are connected in series between the input terminal 10 and the output terminal 20. The diode 5 is connected between the common terminal 15 and the connection point 12. A second capacitor 7 and the transistor 4 are connected in series between the common terminal 15 and the connection point 13. A third induction coil 6 is connected on the one hand to the connection point 12 and on the other hand to the connection point 16 between the capacitor 7 and the drain electrode of transistor 4.

Figure 2:
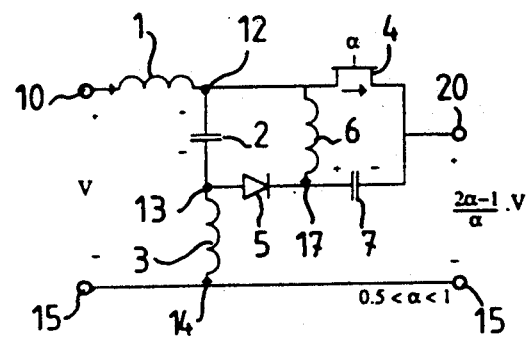
FIG. 2 is a schematic diagram of a buck converter with non-inverted voltage, wherein the three reactive elements are connected in series between an input terminal and a common terminal.

In the arrangement of FIG. 2, the reactive elements 1, 2 and 3 are connected in series between the input terminal 10 and the common terminal 15. The transistor 4 is connected between the connection point 12 and the output terminal 20. The diode 5 is connected in series with a second capacitor 7 between the connection point 13 and the output terminal 20. A third induction coil 6 is connected on the one hand to the connection point 12 and on the other hand to the connection point 17 between the diode 5 and the capacitor 7. This arrangement is also used as a buck converter with non-inverted voltage.

Figure 3:
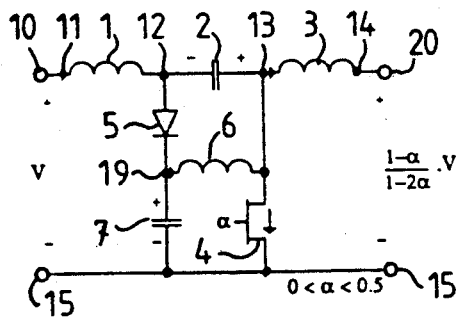
FIG. 3 is a schematic diagram of a non-inverted boost converter with continuous input and output currents, wherein the three reactive elements are connected in series between an input terminal and an output terminal.

In the arrangement of FIG. 3 the reactive elements 1, 2 and 3 are connected in series between the input terminal 10 and the output terminal 20. The transistor 4 is connected between the connection point 13 and the common terminal 15. The diode 5 is connected in series with a capacitor 7 between the connection point 12 and the common terminal 15. A third induction coil 6 is connected on the one hand to the connection point 19 between the diode 5 and the capacitor 7 and on the other hand to the connection point 13. This arrangement is used as a non-inverted boost converter with continuous input and output currents.

Figure 4:
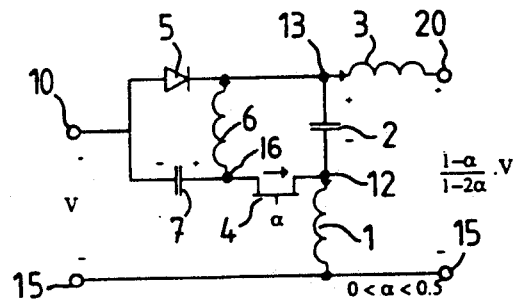
FIG. 4 is a schematic diagram of a non-inverted boost converter with continuous input and output currents, wherein the three reactive elements are connected in series between a common terminal and an output terminal.

The arrangement of FIG. 4 is also used as a non-inverted boost converter. The reactive elements 1, 2 and 3 are connected in series between the common terminal 15 and the output terminal 20. The diode 5 is connected between the input terminal 10 and the connection point 13. A second capacitor 7 is connected in series with the transistor 4 between the input terminal 10 and the connection point 12. A third induction coil 6 is connected between the connection point 13 and the connection point 16 between the second capacitor 7 and the transistor 4.

Figure 5:
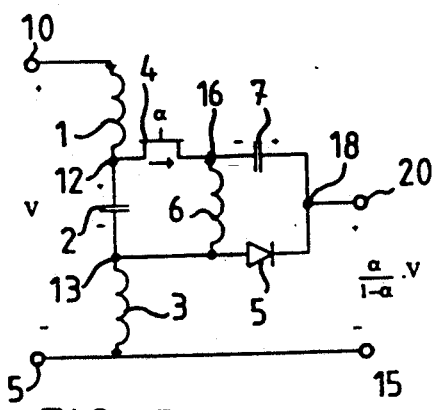
FIG. 5 is a schematic diagram of a non-inverted buck/boost converter with continuous input and output currents, wherein the three reactive elements are connected in series between an input terminal and a common terminal.

The arrangement of FIG. 5 is used as a non-inverted buck/boost converter with continuous input and output currents. In this arrangement, the reactive elements 1, 2 and 3 are connected between the input terminal 10 and the common terminal 15. The transistor 4 is connected in series with a second capacitor 7 between the connection point 12 and a terminal 18 connected to the output terminal 20. The diode 5 is connected between the connection point 13 and said terminal 18. A third induction coil 6 is connected on the one hand to the connection point 16 between the drain electrode of transistor 4 and the capacitor 7 and on the other hand to the connection point 13.

Figure 6:
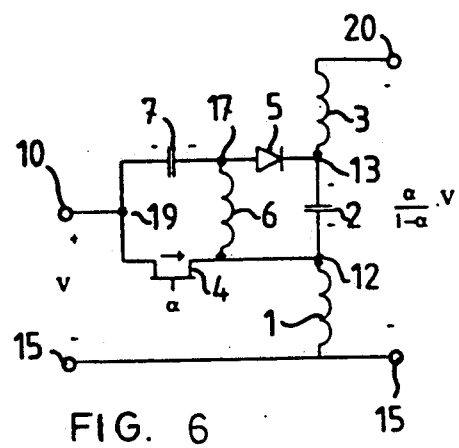
FIG. 6 is a schematic diagram of a non-inverted buck/boost converter with continuous input and output currents, wherein the three reactive elements are connected in series between an output terminal and a common terminal.

In the arrangement of FIG. 6, the reactive elements 1, 2 and 3 are connected in series between the common terminal 15 and the output 20. The transistor 4 is connected between the connection point 12 and a terminal 19 connected to the input terminal 10. The second capacitor 7 is connected in series with the diode 5 between the terminal 19 and the connection point 13. A third induction coil 6 is connected on the one hand to the connection point 17 between the capacitor 7 and the diode 5 and on the other hand to the connection point 12. This arrangement is used as a non-inverted buck/boost converter with continuous input and output currents.

Figure 7:
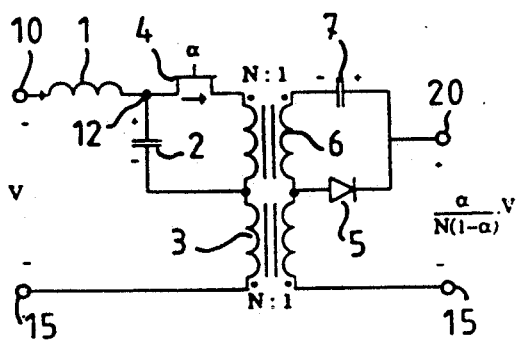
FIG. 7 is a modification of FIG. 5 wherein the two induction coils are replaced by two transformers.
Figure 8:
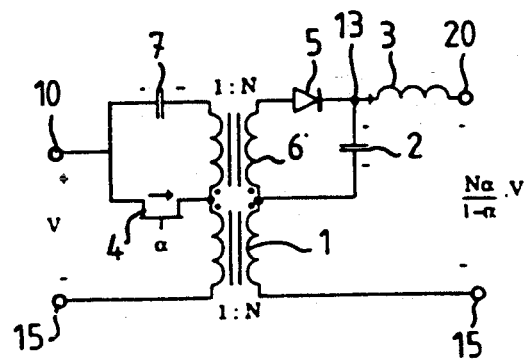
FIG. 8 is a modification of FIG. 6 wherein the two induction coils are replaced by two transformers.

The FIGS. 7 and 8 show two variations to the arrangement of FIGS. 5 and 6 respectively, in which galvanic isolation is provided between the input and the output of the quadripole. More specifically, the arrangement of FIG. 7 is similar to the one of FIG. 5, except that the induction coils 3 and 6 are comprised of two transformers. The arrangement of FIG. 8 is similar to the one of FIG. 6, except that the induction coils 1 and 6 are comprised of two transformers.

Figure 9:
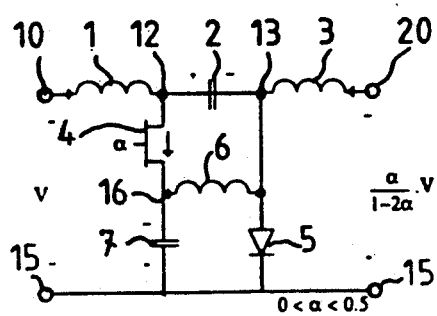
FIG. 9 is a schematic diagram of an inverted buck/boost converter with continuous input and output currents, wherein the three reactive elements are connected in series between an input terminal and an output terminal.

In the arrangement of FIG. 9, the reactive elements 1, 2 and 3 are connected in series between the input terminal 10 and the output terminal 20. The transistor 4 is connected in series with a second capacitor 7 between the connection point 12 and the common terminal 15. The diode 5 is connected between the connection point 13 and the common terminal 15. A third induction coil 6 is connected on the one hand to the common point 16 between the drain electrode of transistor 4 and the capacitor 7 and on the other hand to the connection point 13. This arrangement is used as an inverted buck/boost converter with continuous input and output currents.

Figure 10:
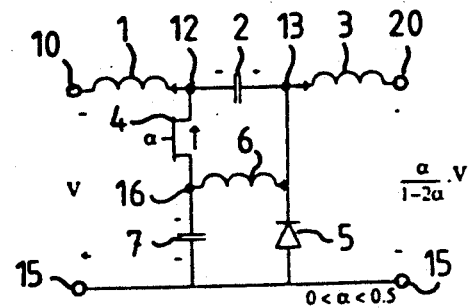
FIG. 10 is a schematic diagram of an inverted buck/boost converter, wherein the three reactive elements are connected in series between an input terminal and an output terminal.

The FIGS. 10 to 16 also show arrangements for inverted buck/boost converters. In the arrangement of FIG. 10, the reactive elements 1, 2 and 3 are connected in series between the input terminal 10 and the output terminal 20. A second capacitor 7 is connected in series with the transistor 4 between the common terminal 15 and the connection point 12. The diode 5 is connected between the common terminal 15 and the connection point 13. A third induction coil 6 is connected on the one hand to the connection point 16 between the transistor 4 and the capacitor 7 and on the other hand to the connection point 13.

Figure 11:
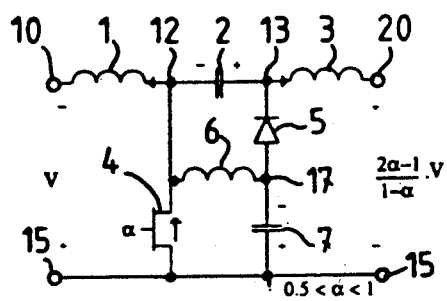
FIG. 11 is a schematic diagram of an inverted buck/boost converter, wherein the three reactive elements are connected in series between an input terminal and an output terminal.

In the arrangement of FIG. 11, the reactive elements 1, 2 and 3 are connected in series between the input terminal 10 and the output terminal 20. The transistor 4 is connected between the common terminal 15 and the connection point 12. A second capacitor 7 and the diode 5 are connected in series between the common terminal 15 and the connection point 13. A third induction coil 6 is connected on the one hand to the connection point 12 and on the other hand to the connection point 17 between the capacitor 7 and the diode 5.

Figure 12:
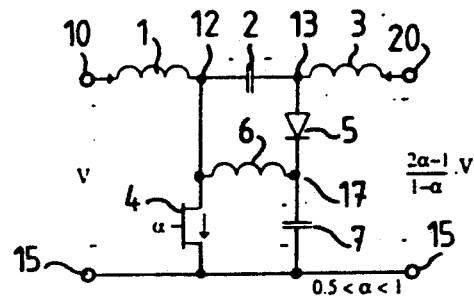
FIG. 12 is a schematic diagram of an inverted buck/boost converter, wherein the three reactive elements are connected in series between an input terminal and an output terminal.

The arrangement of FIG. 12 includes three reactive elements 1, 2 and 3 connected in series between the input terminal 10 and the output terminal 20. The transistor 4 is connected between the connection point 12 and the common terminal 15. The diode 5 is connected in series with a second capacitor 7 between the connection point 13 and the common terminal 15. A third induction coil 6 is connected between the connection point 12 and the connection point 17 between the diode 5 and the capacitor 7.

Figure 13:
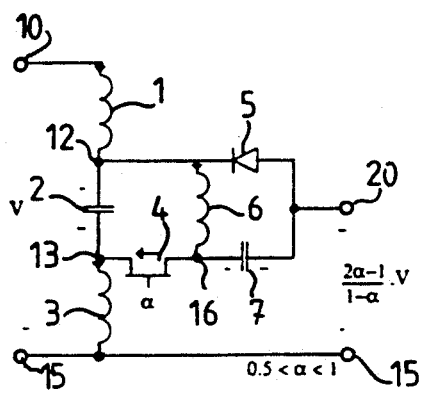
FIG. 13 is a schematic diagram of an inverted buck/boost converter, wherein the three reactive elements are connected in series between an input terminal and a common terminal.

In the arrangement of FIG. 13, the three reactive elements 1, 2 and 3 are connected in series between the input terminal 10 and the common terminal 15. The diode 5 is connected between the output terminal 20 and the connection point 12. A second capacitor 7 is connected in series with the transistor 4 between the output terminal 20 and the connection point 13. A third induction coil 6 is connected between the connection point 12 on one side and the connection point 16 between the capacitor 7 and the transistor 4 on the other side.

Figure 14:
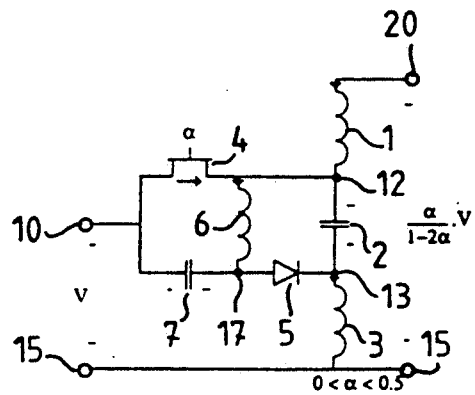
FIG. 14 is a schematic diagram of an inverted buck/boost converter, wherein the three reactive elements are connected in series between an output terminal and a common terminal.

The arrangement of FIG. 14 includes three reactive elements 1, 2 and 3 connected in series between the output terminal 20 and the common terminal 15. The transistor 4 is connected between the input terminal 10 and the connection point 12. A second capacitor 7 is connected in series with the diode 5 between the input terminal 10 and the connection point 13. A third induction coil 6 is connected between the connection point 12 on one side and the connection point 17 between the diode 5 and the capacitor 7 on the other side.

Figure 15:
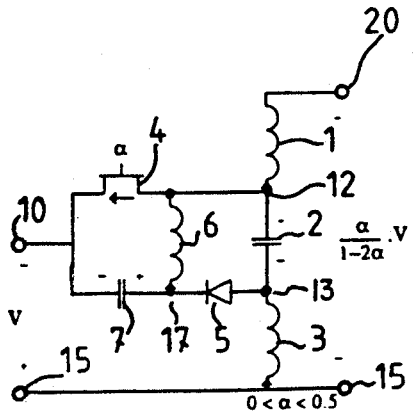
FIG. 15 is a schematic diagram of an inverted buck/boost converter, wherein the three reactive elements are connected in series between an output terminal and a common terminal.

In the arrangement of FIG. 15, the three reactive elements 1, 2 and 3 are connected in series between the output terminal 20 and the common terminal 15. The transistor 4 is connected between the input terminal 10 and the connection point 12. The diode 5 and a second capacitor 7 are connected in series between the connection point 13 and the input terminal 10. A third induction coil 6 is connected between the connection point 12 and the connection point 17 between the diode 5 and the capacitor 7.

Figure 16:
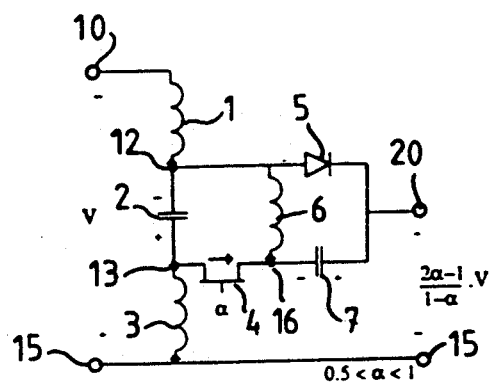
FIG. 16 is a schematic diagram of an inverted buck/boost converter, wherein the three reactive elements are connected in series between an input terminal and a common terminal.

FIG. 16 shows an arrangement in which the three reactive elements 1, 2 and 3 are connected in series between the input terminal 10 and the common terminal 15. The diode 5 is connected between the connection point 12 and the output terminal 20. The transistor 4 is connected in series with a second capacitor 7 between the connection point 13 and the output terminal 20. A third induction coil 6 is connected between the connection point 12 and the connection point 16 between the transistor 4 and the capacitor 7.

Each of the arrangements described in the foregoing can be adjusted in an optimum way for a particular application by properly sizing the reactive elements so as to reduce the output current ripple and the output voltage ripple to a minimum. Further, all the topologies as disclosed have bi-directional properties, i.e. each of terminal pairs of the quadripole which a converter is comprised of, can be used either as an input port or as an output port as well.

I claim:

1. An electric converter comprising:
    at least three reactive elements connected in series, said three reactive elements comprising a first induction coil, a second induction coil, and a first capacitor, said first capacitor being connected between said first induction coil and said second induction coil thereby forming a first connection point between said first induction coil and said first capacitor and a second connection point between said first capacitor and said second induction coil; and
    a switching device, said switching device comprising a switching transistor, a diode, a second capacitor, and a third induction coil, said switching transistor having a source electrode and a drain electrode, said transistor being capable of operating at a high frequency so that it becomes conducting for a fraction of each period of said frequency, said second capacitor and a first one of said diode and said transistor being connected in series with each other and with a first one of said first and second connection points, the other one of said diode and said transistor being connected to the other one of the first and second connection points, the connection of said second capacitor and said first one of said diode and said transistor forming a third connection point, said third induction coil being connected between said third connection point and said other one of the first and second connection points, so that the diode is conducting only when the transistor is non-conducting and so that the diode is non-conducting each time the transistor becomes conducting.

2. An electric converter according to claim 1 further comprising an input terminal, an output terminal, and a common terminal; wherein said at least three reactive elements are connected in series between the input terminal and the output terminal with said first connection point being located between said first capacitor and said input terminal and said second connection point being located between said first capacitor and said output terminal, wherein said diode is connected between the common terminal and said first connection point, wherein said second capacitor and said transistor are connected in series between the common terminal and the second connection point, thereby forming said third connection point between said second capacitor and the source electrode of said transistor, and wherein said third induction coil is connected between said first connection point and said third connection point.

3. An electric converter according to claim 1, further comprising an input terminal, an output terminal, and a common terminal; wherein said at least three reactive elements are connected in series between the input terminal and the common terminal, wherein said transistor is connected between said first connection point and the output terminal, wherein said diode and said second capacitor are connected in series between the second connection point and the output terminal, thereby forming said third connection point between said second capacitor and said diode, and wherein said third induction coil is connected between said first connection point and said third connection point.

4. An electric converter according to claim 1, further comprising an input terminal, an output terminal, and a common terminal; wherein said at least three reactive elements are connected in series between the input terminal and the output terminal with said first connection point being located between said first capacitor and said input terminal and said second connection point being located between said first capacitor and said output terminal, wherein said transistor is connected between said second connection point and the common terminal, wherein said diode and said second capacitor are connected in series between the first connection point and the common terminal, thereby forming said third connection point between said second capacitor and said diode, and wherein said third induction coil is connected between said second connection point and said third connection point.

5. An electric converter according to claim 1, further comprising an input terminal, an output terminal, and a common terminal; wherein said at least three reactive elements are connected in series between the common terminal and the output terminal, wherein said diode is connected between the input terminal and said second connection point, wherein said second capacitor and said transistor are connected in series between the input terminal and said first connection point, thereby forming said third connection point between said second capacitor and said transistor, and wherein said third induction coil is connected between said second connection point and said third connection point.

6. An electric converter according to claim 1, further comprising an input terminal, an output terminal, and a common terminal; wherein said at least three reactive elements are connected in series between the input terminal and the common terminal with said first connection point being located between said first capacitor and said input terminal and said second connection point being located between said first capacitor and said common terminal, wherein said diode is connected between said second connection point and said output terminal, wherein said transistor and said second capacitor are connected in series between said first connection point and the output terminal, thereby forming said third connection point between said second capacitor and the drain electrode of said transistor, and wherein said third induction coil is connected between said second connection point and said third connection point.

7. An electric converter according to claim 6, wherein the second induction coil is a part of a first transformer, and wherein the third induction coil is a part of a second transformer.

8. An electric converter according to claim 1, further comprising an input terminal, an output terminal, and a common terminal; wherein said at least three reactive elements are connected in series between the common terminal and the output terminal with said first connection point being located between said first capacitor and said common terminal and said second connection point being located between said first capacitor and said output terminal, wherein said transistor is connected between said first connection point and said input terminal, wherein said second capacitor and said diode are connected in series between the input terminal and said second connection point, thereby forming said third connection point between said second capacitor and said diode, and wherein said third induction coil is connected between said first connection point and said third connection point.

9. An electric converter according to claim 8, wherein the first induction coil is a part of a first transformer, and wherein the third induction coil is a part of a second transformer.

10. An electric converter according to claim 8, further comprising an input terminal, an output terminal, and a common terminal; wherein said at least three reactive elements are connected in series between the input terminal and the output terminal with said first connection point being located between said first capacitor and said input terminal and said second connection point being located between said first capacitor and said output terminal, wherein said diode is connected between said second connection point and said common terminal, wherein said transistor and said second capacitor are connected in series between said first connection point and the common terminal, thereby forming said third connection point between said second capacitor and the drain electrode of said transistor, and wherein said third induction coil is connected between said second connection point and said third connection point.

11. An electric converter according to claim 1, further comprising an input terminal, an output terminal, and a common terminal; wherein said at least three reactive elements are connected in series between the input terminal and the output terminal with said first connection point being located between said first capacitor and said input terminal and said second connection point being located between said first capacitor and said output terminal, wherein said diode is connected between said second connection point and said common terminal, wherein said transistor and said second capacitor are connected in series between said first connection point and the common terminal, thereby forming said third connection point between said second capacitor and the source electrode of said transistor, and wherein said third induction coil is connected between said second connection point and said third connection point.

12. An electric converter according to claim 1, further comprising an input terminal, an output terminal, and a common terminal; wherein said at least three reactive elements are connected in series between the input terminal and the output terminal with said first connection point being located between said first capacitor and said input terminal and said second connection point being located between said first capacitor and said output terminal, wherein the drain electrode of said transistor is connected to said first connection point and the source electrode of said transistor is connected to said common terminal, wherein said diode and said second capacitor are connected in series between said second connection point and the common terminal, thereby forming said third connection point between said second capacitor and said diode, and wherein said third induction coil is connected between said first connection point and said third connection point.

13. An electric converter according to claim 1, further comprising an input terminal, an output terminal, and a common terminal; wherein said at least three reactive elements are connected in series between the input terminal and the output terminal with said first connection point being located between said first capacitor and said input terminal and said second connection point being located between said first capacitor and said output terminal, wherein the source electrode of said transistor is connected to said first connection point and the drain electrode of said transistor is connected to said common terminal, wherein said diode and said second capacitor are connected in series between said second connection point and the common terminal, thereby forming said third connection point between said second capacitor and said diode, and wherein said third induction coil is connected between said first connection point and said third connection point.

14. An electric converter according to claim 1, further comprising an input terminal, an output terminal, and a common terminal; wherein said at least three reactive elements are connected in series between the input terminal and the common terminal with said first connection point being located between said first capacitor and said input terminal and said second connection point being located between said first capacitor and said common terminal, wherein said diode is connected between said first connection point and said output terminal, wherein said transistor and said second capacitor are connected in series between said second connection point and the output terminal with the drain electrode of said transistor being connected to said second connection point, thereby forming said third connection point between said second capacitor and said transistor, and wherein said third induction coil is connected between said first connection point and said third connection point.

15. An electric converter according to claim 1, further comprising an input terminal, an output terminal, and a common terminal; wherein said at least three reactive elements are connected in series between the output terminal and the common terminal with said first connection point being located between said first capacitor and said output terminal and said second connection point being located between said first capacitor and said common terminal, wherein the drain electrode of said transistor is connected to said first connection point and the source electrode of said transistor is connected to said input terminal, wherein said second capacitor and said diode are connected in series between said input terminal and said second connection point, thereby forming said third connection point between said second capacitor and said transistor, and wherein said third induction coil is connected between said first connection point and said third connection point.

16. An electric converter according to claim 1, further comprising an input terminal, an output terminal, and a common terminal; wherein said at least three reactive elements are connected in series between the output terminal and the common terminal with said first connection point being located between said first capacitor and said output terminal and said second connection point being located between said first capacitor and said common terminal, wherein the source electrode of said transistor is connected to said first connection point and the drain electrode of said transistor is connected to said input terminal, wherein said second capacitor and said diode are connected in series between said input terminal and said second connection point, thereby forming said third connection point between said second capacitor and said transistor, and wherein said third induction coil is connected between said first connection point and said third connection point.

17. An electric converter according to claim 1, further comprising an input terminal, an output terminal, and a common terminal; wherein said at least three reactive elements are connected in series between the input terminal and the common terminal with said first connection point being located between said first capacitor and said input terminal and said second connection point being located between said first capacitor and said common terminal, wherein the diode is connected between said first connection point and the output terminal, wherein said transistor and said second capacitor are connected in series between said second connection point and the output terminal with the source electrode of said transistor being connected to said second connection point, thereby forming said third connection point between said second capacitor and said transistor, and wherein said third induction coil is connected between said first connection point and said third connection point.

* * * * *